US009628853B2

(12) United States Patent
Singh et al.

(10) Patent No.: US 9,628,853 B2
(45) Date of Patent: Apr. 18, 2017

(54) SEAMLESS DISPLAY OF VIDEO DURING CONNECTION SWITCHING

(71) Applicant: Apple Inc., Cupertino, CA (US)

(72) Inventors: Ajoy K. Singh, Milpitas, CA (US); Tarik Tabet, San Jose, CA (US); Wen Zhao, San Jose, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 446 days.

(21) Appl. No.: 14/041,912

(22) Filed: Sep. 30, 2013

(65) Prior Publication Data
US 2015/0095955 A1 Apr. 2, 2015

(51) Int. Cl.
H04N 7/16 (2011.01)
H04N 21/44 (2011.01)
H04N 21/462 (2011.01)
H04N 21/61 (2011.01)
H04N 21/6405 (2011.01)
H04N 21/6408 (2011.01)

(52) U.S. Cl.
CPC ... *H04N 21/44004* (2013.01); *H04N 21/4622* (2013.01); *H04N 21/6131* (2013.01); *H04N 21/6405* (2013.01); *H04N 21/6408* (2013.01)

(58) Field of Classification Search
CPC .................. H04N 21/44004; H04N 21/6131
USPC ...................................................... 725/62, 94
See application file for complete search history.

(56) References Cited

U.S. PATENT DOCUMENTS

| 9,497,789 | B1* | 11/2016 | Kosireddy | .......... | H04W 76/023 |
| 2013/0265941 | A1* | 10/2013 | Chang | ................ | H04L 12/2856 370/328 |
| 2013/0294321 | A1* | 11/2013 | Wang | ..................... | H04W 4/06 370/312 |
| 2015/0131502 | A1* | 5/2015 | Narasimha | ........ | H04W 52/0212 370/311 |
| 2015/0163743 | A1* | 6/2015 | Narasimha | ........ | H04W 52/0254 370/311 |

* cited by examiner

*Primary Examiner* — Pankaj Kumar
*Assistant Examiner* — Sahar Baig
(74) *Attorney, Agent, or Firm* — Meyertons, Hood, Kivlin, Kowert & Goetzel, P.C.

(57) ABSTRACT

An electronic device uses one antenna to wirelessly communicate information with two different wireless networks via concurrent connections associated with different radio access technologies. More specifically, the electronic device may receive video via a first of the connections using a multicast communication protocol. In order to maintain the second connection, the electronic device may switch, for a time interval, from the first connection to the second connection during switching events. This switching can disrupt displayed content associated with the video. To prevent this disruption, in response to a trigger that warns of an upcoming switching event, the electronic device accesses a portion of the video in a buffer during the time interval associated with the switching event. When the communication circuit switches back to the first connection after the switching event, the electronic device reverts to the video communication using the multicast communication protocol.

20 Claims, 5 Drawing Sheets

SEAMLESS DISPLAY OF VIDEO DURING CONNECTION SWITCHING

BACKGROUND

Field

The described embodiments relate to techniques for displaying video without disruption while switching between simultaneous connections to different wireless networks.

Related Art

Many modern electronic devices include a networking subsystem that is used to wirelessly communicate with other electronic devices via a wireless network. For example, these electronic devices can include a networking subsystem with a cellular network interface (UMTS, CDMA, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface.

Because streaming video to multiple electronic devices consumes significant network resources and can result in congestion, many wireless networks support multicast communication of video to the multiple electronic devices from a common source. In addition, many networking subsystems support concurrent or simultaneous connections to different wireless networks.

However, if a common antenna is used by a networking subsystem during communication with different wireless networks via the simultaneous connections, in some situations it may be difficult to avoid disrupting the multicast communication of video via one of the connections. For example, in order to maintain the simultaneous connections to the different networks, the networking subsystem in an electronic device may need to periodically switch from the first connection to the second connection to receive paging messages. During this time interval, the networking subsystem may not receive the multicast video stream, which may result in breaks in displayed video. These breaks may frustrate users and can degrade the user experience.

SUMMARY

The described embodiments include an electronic device. This electronic device includes an antenna and a communication circuit, coupled to the antenna, which communicates information with a first wireless network using a first connection and a second wireless network using a second connection, where the first connection and the second connection are concurrent. Note that video is communicated to the electronic device via the first connection using a multicast communication protocol, and the communication circuit switches, for a time interval, from the first connection to the second connection during switching events in order to maintain the second connection. Moreover, the electronic device includes a processor coupled to the communication circuit, and memory that stores a program module that is executed by the processor. The program module avoids disruption of displayed content associated with the video. In particular, the program module: receives a trigger that warns of an upcoming switching event; accesses a portion of the video in a buffer in the memory to avoid the disruption of the displayed content associated with the video during the time interval associated with the switching event; and reverts to the video communication using the multicast communication protocol when the communication circuit switches back to the first connection after the switching event.

Moreover, a given connection may be: an active connection in which more data is communicated than is needed to maintain the given connection; and/or a standby connection in which data needed to maintain the given connection is communicated.

Furthermore, the first wireless network and the second wireless network may be associated with different radio access technologies.

Additionally, during the switching event, the communication circuit may receive a paging message using the second connection.

In some embodiments, the trigger is received from the communication circuit. Alternatively, the program module may generate the trigger. Note that the trigger may indicate: a start of the switching event and the time interval; and/or the start of the switching event and a switching pattern that indicates when subsequent switching events occur. In another approach, prior to reverting to the video communication using the multicast communication protocol, the program module may receive a second trigger that indicates an end of the switching event.

Moreover, prior to accessing the video in the buffer, the program module may: request communication of the portion of the video to be received via the first connection using a unicast communication protocol; and may receive and store the portion of the video in the buffer. Alternatively, prior to accessing the video in the buffer, the program module may: receive the portion of the video via the first connection using a unicast communication protocol; and store the portion of the video in the buffer. In another approach, the portion of the video in the buffer may be associated with a time delay between receipt of the video by the electronic device and display of the content associated with the video.

Another embodiment provides an integrated circuit that includes the communication circuit. The communication circuit may include: a node that couples to the antenna to communicate signals associated with wireless communication; and control logic. Moreover, the control logic may: receive the video via the first connection using the multicast communication protocol; receive the trigger signal that warns of the upcoming switching event; receive the portion of the video via the first connection using the unicast communication protocol to avoid disruption of displayed content associated with the video during the time interval associated with the switching event; and switch, for the time interval, from the first connection to the second connection during the switching event in order to maintain the second connection.

Another embodiment provides a method for avoiding disruption of the displayed content. During the method, signals associated with the first wireless network are received using the first connection, where the signals include the video communicated using the multicast communication protocol, and where the second connection with the second wireless network is maintained concurrently with the first connection by switching, for the time interval, from the first connection to the second connection during the switching events. Then, a trigger is received that warns of the upcoming switching event. Moreover, the portion of the video in the buffer in the memory is accessed to avoid the disruption of the displayed content associated with the video during the time interval associated with the switching event. Next, the video communication using the multicast communication protocol is reverted to after the switching event.

In some embodiments, prior to reverting to the video communication using the multicast communication protocol, the second trigger that indicates the end of the switching event is received.

Moreover, prior to accessing the video in the buffer, communication of the portion of the video to be received via the first connection using the unicast communication protocol may be requested, and the portion of the video may be received and stored in the buffer. Alternatively, prior to accessing the video in the buffer, the portion of the video may be received via the first connection using the unicast communication protocol, and the portion of the video may be stored in the buffer.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device uses one antenna to wirelessly communicate information with two different wireless networks via concurrent connections associated with different radio access technologies. More specifically, the electronic device may receive video via a first of the connections using a multicast communication protocol (which is sometimes referred to as a 'multicast channel' or a 'multicast communication mechanism'). In order to maintain the second connection, the electronic device may switch, for a time interval, from the first connection to the second connection during switching events. This switching can disrupt displayed content associated with the video. To prevent this disruption, in response to a trigger that warns of an upcoming switching event, the electronic device may request communication of a portion of the video, which is received via the first connection using a unicast communication protocol (which is sometimes referred to as a 'unicast channel' or a 'unicast communication mechanism') and is then stored in a buffer. Subsequently, the electronic device accesses a portion of the video in a buffer during the time interval associated with the switching event. When the communication circuit switches back to the first connection after the switching event, the electronic device reverts to the video communication using the multicast communication protocol.

By prefetching the portion of the video using the unicast communication protocol, this communication technique may prevent disruption of the displayed content during the switching events. Consequently, the communication technique may prevent user frustration and, thus, may improve the user experience when using the electronic device.

In the discussion that follows, the wireless communication includes cellular-telephone communication protocol in a cellular network, such as a so-called third-generation (3G) communication protocol, a 3.5G communication protocol, 4G communication protocol (such as Long Term Evolution or LTE), etc. For example, the wireless communication may include Enhanced Multicast Broadcast Multimedia Streaming (eMBMS), a multicast communication protocol from the $3^{rd}$ Generation Partnership Project in Asia, Europe and North America. However, the communication technique may be used with a wide variety of other communication protocols, such as: Wi-Fi® (from the Wi-Fi Alliance of Austin, Tex.) communication protocol (and, more generally, a wireless communication protocol described in the Institute of Electrical and Electronics Engineers (IEEE) standards 802.11), Bluetooth™ (from the Bluetooth Special Interest Group of Kirkland, Wash.), and/or other types of wireless interfaces.

Figure 1:
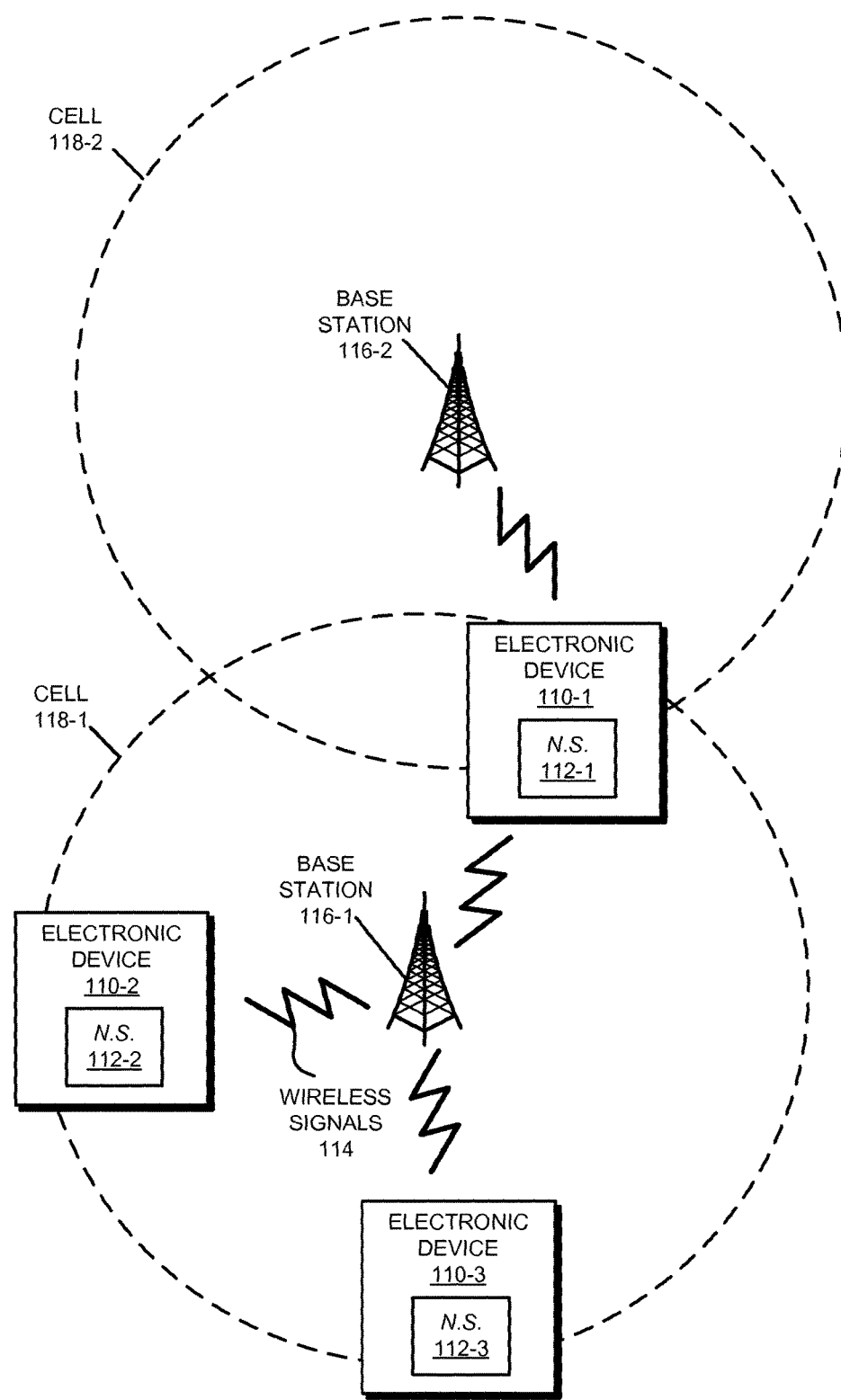
FIG. 1 is a block diagram illustrating electronic devices wirelessly communicating in accordance with an embodiment of the present disclosure.

The wireless communication between electronic devices is shown in FIG. 1, which presents a block diagram illustrating electronic devices 110 in a cellular network. These electronic devices may wirelessly communicate packets with each other. Moreover, the wireless communication may occur via one or more base stations 116 that currently provide cellular service to electronic devices 110 in cells 118.

As described further below with reference to FIG. 5, each of electronic devices 110 may include subsystems (such as a networking subsystem, a memory subsystem and a processor subsystem) that facilitate the wireless communication. In particular, electronic devices 110 may include radios in networking subsystems (N.S.) 112. More generally, electronic devices 110 can include (or can be included within) any electronic devices with the networking subsystems that enable electronic devices 110 to wirelessly communicate with one or more other electronic devices. This can comprise: transmitting messages on wireless channels to enable electronic devices to make initial contact, followed by exchanging subsequent messages to establish or maintain a connection, and transmitting and receiving packets or frames via the connection, etc. As can be seen in FIG. 1, wireless signals 114 (represented by jagged lines) are communicated with base stations 116 in cells 118 using radios in electronic devices 110.

In the described embodiments, processing a packet or frame in electronic devices 110 includes: receiving wireless signals 114 with the packet or frame; decoding/extracting the packet or frame from received wireless signals 114 to acquire the packet or frame; and processing the packet or frame to determine information contained in the packet or frame (such as a command or information in the payload).

The networking subsystem in a given one of electronic devices 110 (such as electronic device 110-1) may allow a common antenna to be used during wireless communication with two or more different wireless networks with different radio access technologies. In particular, the networking subsystem may establish and maintain two or more concurrent or simultaneous connections to the two or more wireless networks. Note that 'simultaneous connection' or 'concurrent connection' may mean a single radio device simultaneously registered with multiple wireless networks. In order to receive incoming call over another wireless network (such as the second wireless network) while actively communicating over the first wireless network, the given one of electronic devices 110 may need to tune away from the first wireless network to the other wireless network to receive an incoming page message. Then, the given one of electronic devices 110 can determine whether or not to accept the incoming call. Consequently, in order to maintain the two or more connections, electronic devices 110 may routinely or regularly switch back and forth among the two or more connections. This may allow electronic devices 110 to exchange information with base stations 116, such as in response to a paging message.

However, this switching can disrupt the information that is communicated using one of the connections. For example, in order to manage limited network resources and to reduce congestion in one of the wireless networks, electronic device 110-1 may receive video via a first connection with a first wireless network using a multicast communication protocol. If electronic device 110-1 switches briefly to a second connection with a second wireless network (e.g., for a time interval), the multicast communication may be disrupted during such a 'switching event.' This may result in a break in the video and, thus, in displayed content associated with the video on electronic device 110-1.

Electronic device 110-1 may use the communication technique to address this communication challenge. In particular, in response to a trigger that warns of an upcoming switching event, electronic device 110-1 may access a portion of the video in a buffer to avoid the disruption of the displayed content associated with the video during the time interval associated with the switching event. For example, in response to the trigger, electronic device 110-1 may request that the portion of the video be communicated to electronic device 110-1 by base station 116-1 using a unicast communication protocol. This portion of the video may be received and stored in the buffer, and then accessed for display on electronic device 110-1. Furthermore, after the switching event (when electronic device 110-1 switches back to the first connection), electronic device 110-1 may revert to the video communication using the multicast communication protocol.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
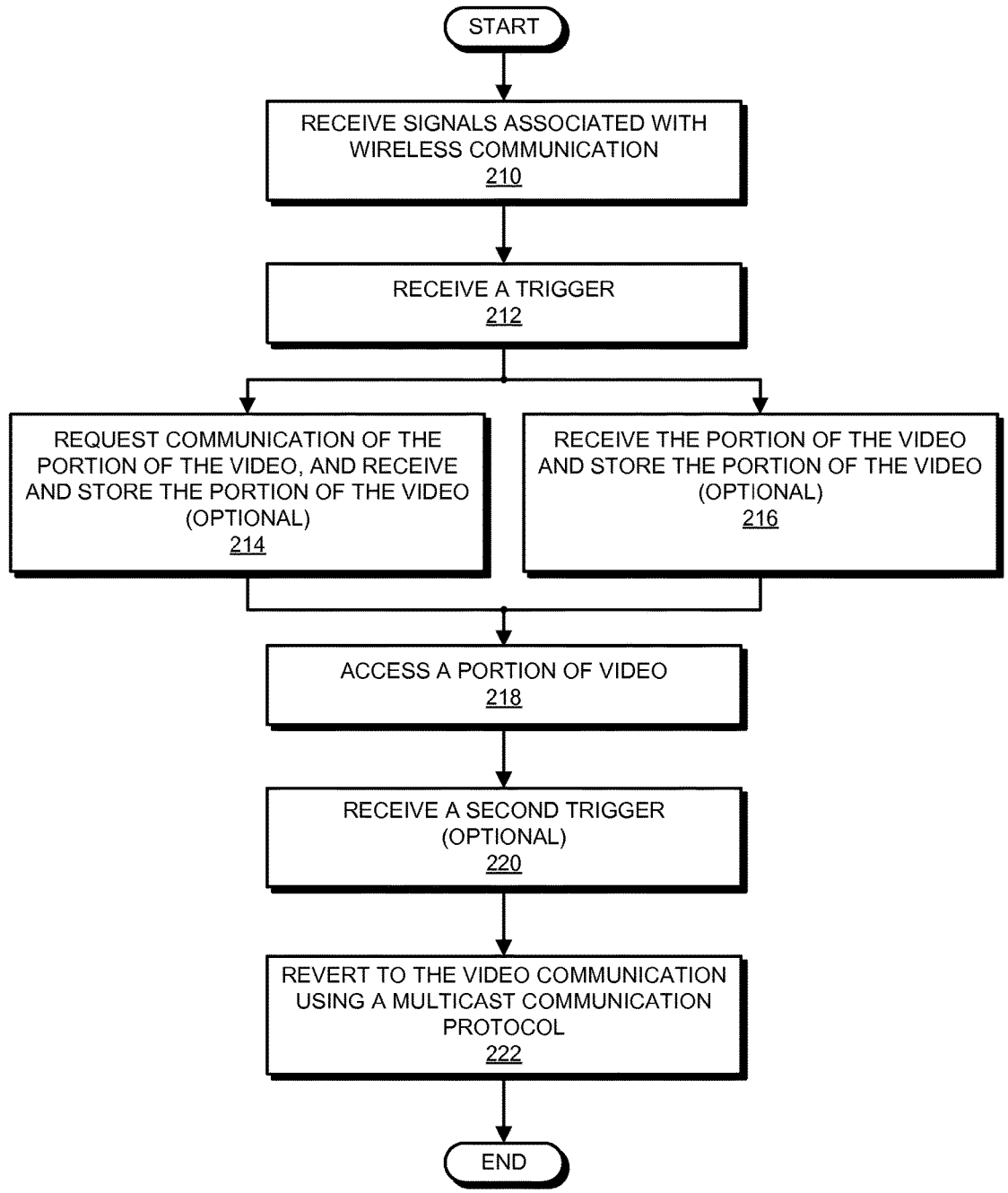
FIG. 2 is a flow diagram illustrating a method for avoiding disruption of displayed content in one of the electronic devices in FIG. 1 in accordance with an embodiment of the present disclosure.

The communication technique may be implemented on the given one of electronic devices 110 using hardware and/or software executing in an environment of the given electronic device. For example, the trigger may be provided by a baseband circuit (i.e., control logic in the networking subsystem) or may be generated by a software application in a software layer in a protocol stack. The communication technique is shown in FIG. 2, which presents a flow diagram illustrating a method 200 for avoiding disruption of displayed content, which may be performed by electronic device 500 in FIG. 5. During operation, the electronic device receives signals associated with wireless communication (operation 210) with the first wireless network using the first connection, where the signals include the video communicated using the multicast communication protocol, and where the second connection with the second wireless network is maintained concurrently with the first connection by switching, for the time interval, from the first connection to the second connection during the switching events. Note that a given connection may be: an active connection in which more data is communicated than is needed to maintain the given connection; and/or a standby connection in which data needed to maintain the given connection is communicated.

Then, the electronic device receives the trigger (operation 212) that warns of the upcoming switching event.

Moreover, the electronic device accesses the portion of the video (operation 218) in the buffer in memory to avoid the disruption of the displayed content associated with the video during the time interval associated with the switching event.

Next, the electronic device reverts to the video communication using the multicast communication protocol (operation 222) after the switching event.

Moreover, prior to accessing the video in the buffer (operation 218), the electronic device optionally requests communication of the portion of the video (operation 214) to be received via the first connection using the unicast communication protocol, and the electronic device optionally receives and stores the portion of the video (operation 214) in the buffer. Thus, for a period of time necessary to receive the portion of the video, the electronic device may receive, from a streaming or media server, video using the multicast communication protocol and the unicast communication protocol. Alternatively, the first wireless network may be aware of the upcoming switching event. Consequently, prior to accessing the video in the buffer (operation 218), the electronic device optionally receives the portion of the video (operation 216) via the first connection using the unicast communication protocol (without making the request), and the electronic device optionally stores the portion of the video (operation 216) in the buffer. Thus, the electronic device may 'pull' the portion of the video from the first wireless network using the unicast communication protocol or, if the first wireless network has knowledge of the timing of the switching event, the first wireless network may 'push' the portion of the video using the unicast communication protocol and/or the multicast communication protocol. However, in another approach, the portion of the video in the buffer may be associated with a time delay between receipt of the video by the electronic device and display of the content associated with the video. For example, when an application that displays the video is first started, a time delay that exceeds at least the time interval may occur before the content is displayed to ensure that sufficient video is stored in the buffer to ensure that there is no disruption of the displayed content during at least a first switching event.

Note that the trigger may indicate: a start of the switching event and the time interval; and/or the start of the switching event and a switching pattern that indicates when subsequent switching events occur. In another approach, prior to reverting to the video communication using the multicast communication protocol (operation 222), the electronic device optionally receives a second trigger (operation 220) that indicates an end of the switching event. Thus, there may be one trigger or two triggers (i.e., a start and a stop trigger) associated with a given switching event. Alternatively, by communicating the switching pattern, the trigger may only be needed for the first switching event. Subsequent switching events may be predicted by the communication circuit in the electronic device based on the switching pattern.

In some embodiments of method 200, there may be additional or fewer operations. Moreover, the order of the operations may be changed, and/or two or more operations may be combined into a single operation.

Figure 3:
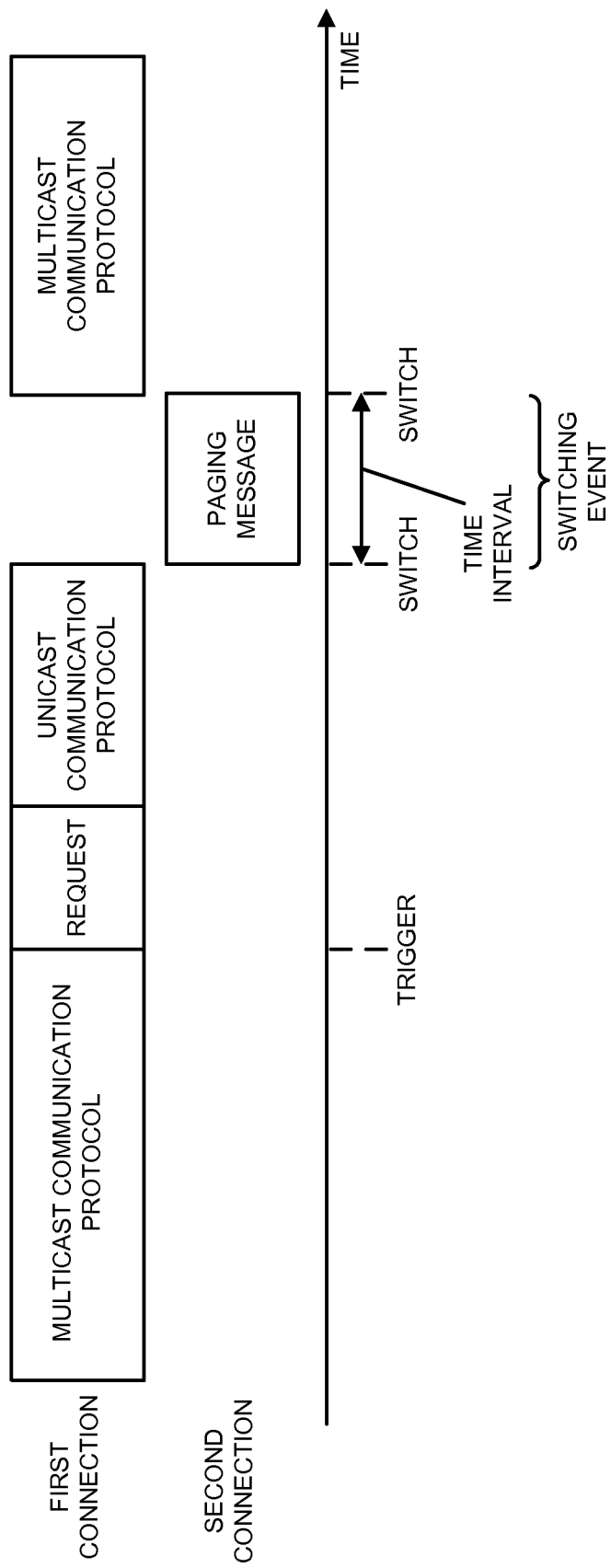
FIG. 3 is a timing diagram illustrating a switching event in the method of FIG. 2 in accordance with an embodiment of the present disclosure.

FIG. 3 presents a timing diagram illustrating a switching event during operation of the electronic device during method 200 (FIG. 2). In FIG. 3, the electronic device initially communicates the video via the first connection with the first wireless network using the multicast communication protocol. Subsequently, the electronic device may receive the trigger indicating the upcoming switching event.

In response to the trigger, the electronic device may request and then may receive the portion of the video via the first connection using the unicast communication protocol. The portion of the video may be stored in the buffer (such as a re-sequencing buffer).

Next, the electronic device may access the stored portion of the video, and may use it to avoid disruption of displayed content associated with the video during the switching event. Moreover, the electronic device may switch to the second connection for the time interval of the switching event. Note that the time interval may provide an upper bound on the duration of the switching event (i.e., the duration of the switching from the first connection to the second connection and then back to the first connection). After the switching event (i.e., when the electronic device switches back to the first connection), the electronic device may revert to the video received via the first connection using the multicast communication protocol.

We now describe exemplary embodiments of the communication technique. In these examples, the first connection uses LTE and the second connection uses CDMA. Moreover, the electronic device uses a single radio to support the first connection and the second connection. Furthermore, the multicast communication protocol may include an eMBMS channel and a File Delivery over Unidirectional Transport (FLUTE) protocol, the request for the portion of the video may use a Hypertext Transfer Protocol (HTTP), and the unicast communication protocol may include live streaming over HTTP or another streaming protocol.

In particular, at a given time the electronic device can receive data from an LTE eNodeB or a CDMA base station. In order to support a mobile terminated call, when active on the LTE network the electronic device periodically tunes out (i.e., switches) and listens to the CDMA paging channel to monitor for an incoming CDMA call. Tuning out may also be needed to maintain the connection with the CDMA network.

In order to avoid interruption of the video or media stream when the electronic device tunes out from the LTE network to the CDMA network to listen for a page, the modem or software in the electronic device may notify the eMBMS service layer sufficiently ahead of time (e.g., using a trigger or an interrupt) to inform the service layer that the baseband is about to tune away from LTE to CDMA. Upon detecting that the modem is about to tune away from LTE to CDMA, the service layer may initiate an HTTP request to a streaming server to download a future chunk of video content that it could have received over the eMBMS channel via the FLUTE protocol during the blackout period (i.e., during the time interval). Note that the number and size of the chunks of video (i.e., the portion of the video) to download may be based on the approximate estimated blackout period the electronic device may encounter when tuning the radio away from LTE to CDMA. For example, timestamps, headers and/or metadata in the packets or chunks, as well as the data rate on the first connection or link, may allow the electronic device to determine the number and size of chunks to download when pre-fetching the portion of the video. The service layer may download enough content from the streaming server using HTTP unicast communication protocol so that it is able to combine the video-streaming content received using the multicast communication protocol with that from the unicast communication protocol to provide seamless service to a user of the electronic device. Furthermore, the service layer may discard any duplicate video content if it has received the same content using the unicast communication protocol and the multicast communication protocol. After the electronic device tunes back from CDMA to LTE, the modem may inform the service layer so that the electronic device can resume receiving the video over eMBMS.

Furthermore, in order to provide a seamless user experience with the live-streaming server, when the user initiates live content, an application or software program (which is sometimes referred to as a live-streaming client) executing on the electronic device may buffer the video or media for the maximum expected blackout period, and then may start playing the video after the expiration of the initial buffering period so that the electronic device is able to mitigate the glitch associated with the switching events by fetching future video using the unicast communication protocol or via an error-recovery mechanism provided by the FLUTE protocol before the electronic device tunes away from LTE to CDMA. For example, if the blackout period associated with switching to CDMA is one second, the live-streaming client may buffer one second of video in a local buffer on the electronic device before playing the content associated with the video to the user. (More generally, the time interval may, in part, be determined based on the resources in the first wireless network and the second wireless network. Consequently, the time interval may be 100 ms, 1 s, 2 s, etc.) While this adds latency, by locally buffering the initial content associated with the video the electronic device may be able to recover from a blackout period of one second by pre-fetching one second of data from the live-streaming server prior to switching from LTE to CDMA.

Figure 4:
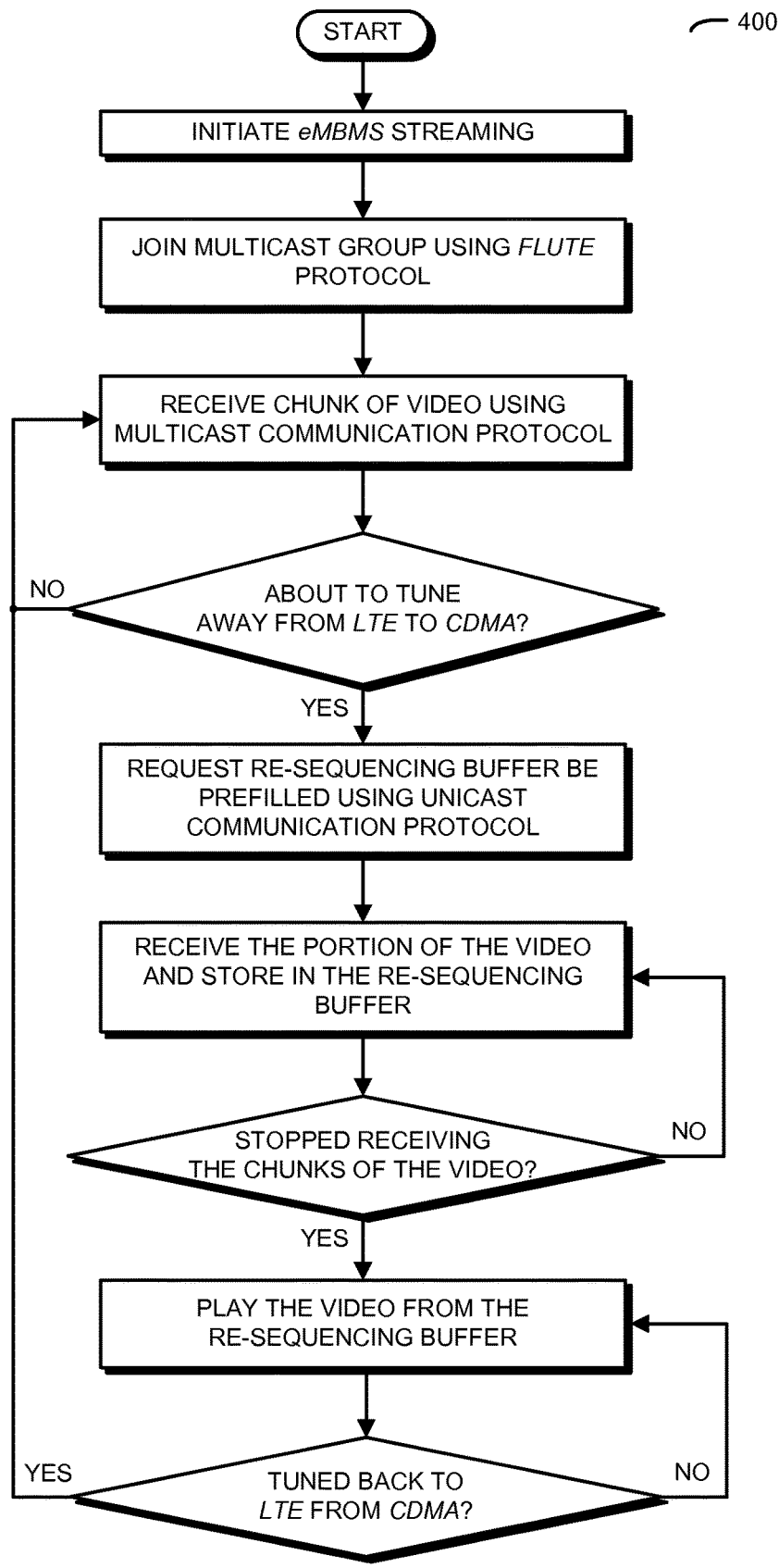
FIG. 4 is a flow diagram illustrating a method for avoiding disruption of displayed content in one of the electronic devices in FIG. 1 in accordance with an embodiment of the present disclosure.
Figure 5:
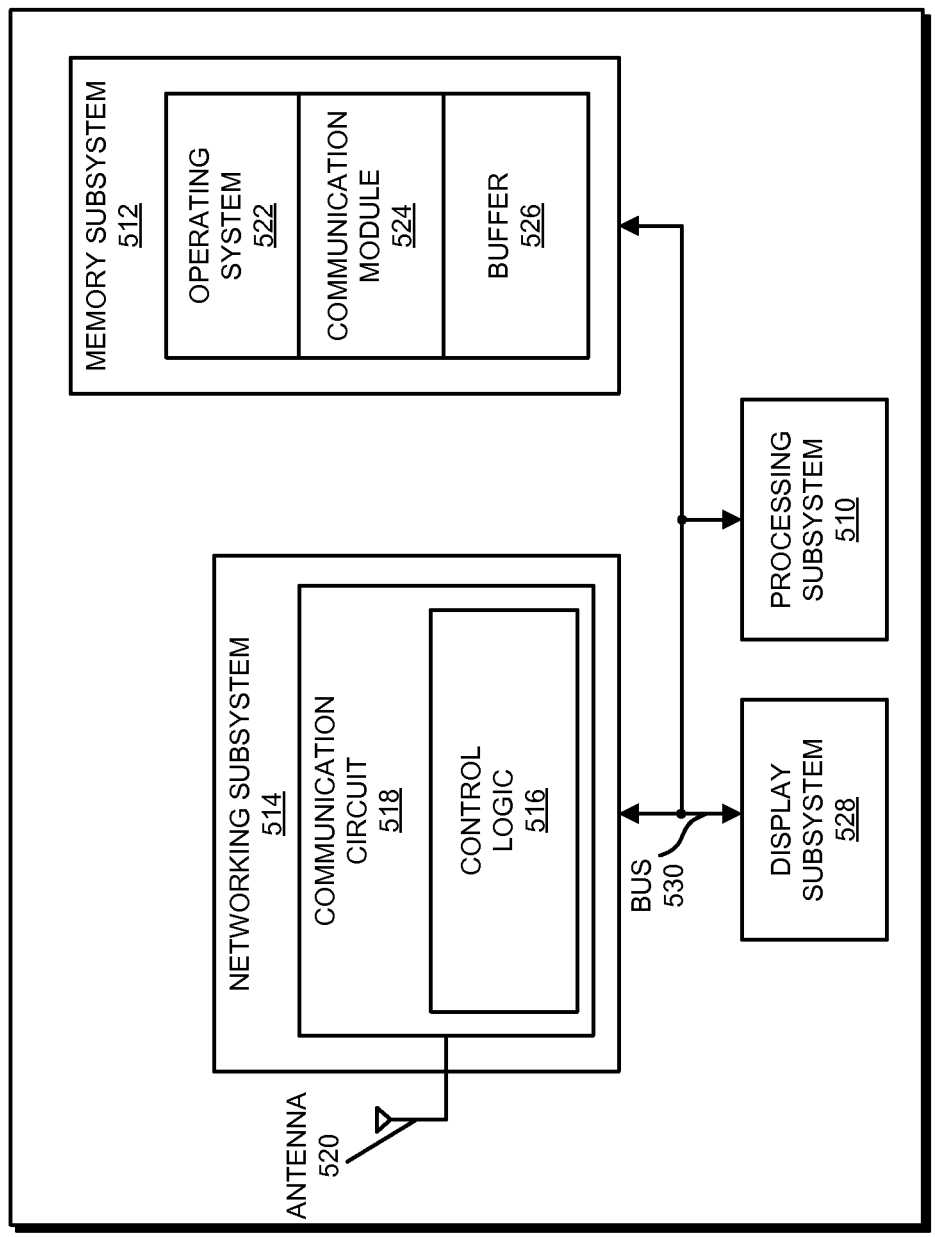
FIG. 5 is a block diagram illustrating one of the electronic devices of FIG. 1 in accordance with an embodiment of the present disclosure.

FIG. 4 presents a flow diagram illustrating a method 400 for avoiding disruption of displayed content, which may be performed by electronic device 500 in FIG. 5. During operation, the electronic device initiates streaming of the video via eMBMs and joins a multicast group using the FLUTE protocol. Then, the electronic device may receive a chunk of video content using the multicast communication protocol.

If the electronic device is not about to tune away from LTE to CDMA to monitor the radio page, the electronic device may continue to receive the chunks of video. Otherwise, the electronic device may request that the re-sequencing buffer be prefilled using the unicast communication protocol, which enables the electronic device to download the video chunks that would otherwise be lost during the time interval or the blackout. Next, the electronic device may receive the portion of the video using the unicast communication protocol. Chunks in the portion of the video may be stored in the re-sequencing buffer in the order they were received from the live-streaming server.

If the electronic device stops receiving chunks of video using the unicast communication protocol, the electronic device may play the video from the re-sequencing buffer. This continues until the electronic device tunes back to LTE from CDMA.

Thus, the described embodiments of the communication technique may maintain the second connection while ensuring that the displayed content associated with the video is not disrupted by the switching events. In these ways, the communication technique may be used to maintain communication performance without knowledge of a user of the electronic device, thereby preventing user frustration and improving user satisfaction with the electronic device.

In another embodiment, the communication circuit in the electronic device may communicate with the first wireless network using the first connection. In particular, via the first wireless network, the multicast communication protocol may provide the video. Initially, the second connection may be idle. Then, a phone call may be received and the second connection may be established. When this occurs, the electronic device may pre-fetch the portion of the video via the first connection using the unicast communication protocol. Moreover, for the duration of the phone call, the electronic device may stop display of the content associated with the video. After the phone call ends, the portion of the video stored in the buffer may be displayed while the electronic device restarts receiving the video via the first connection using the multicast communication protocol.

We now describe embodiments of the electronic device. FIG. 5 presents a block diagram illustrating an electronic device 500. This electronic device includes processing subsystem 510, memory subsystem 512, and networking subsystem 514 with communication circuit 518. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as communication module 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured, to be executed by processing subsystem 510. Note that communication module 524 may include software and/or firmware.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, a communication circuit 518 and an antenna 520. For example, networking subsystem 514 can include a Bluetooth™ networking system, a cellular networking system (e.g., a 3G/4G network such as UMTS, LTE, CDMA, etc.), a universal serial bus (USB) networking system, a networking system based on the standards described in IEEE 802.11 (e.g., a Wi-Fi® networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising frames and/or scanning for advertising frames transmitted by other electronic devices.

Within electronic device 500, processing subsystem 510, memory subsystem 512, and networking subsystem 514 are coupled together using bus 530. Bus 530 may include an electrical, optical, and/or electro-optical connection that the subsystems can use to communicate commands and data among one another. Although only one bus 530 is shown for clarity, different embodiments can include a different number or configuration of electrical, optical, and/or electro-optical connections between the subsystems.

In some embodiments, electronic device 500 includes a display subsystem 528 for displaying information on a display, which may include a display driver and the display, such as a liquid-crystal display, a touchscreen, etc.

Furthermore, as described previously, communication circuit 518 and/or communication module 524 may perform the operations in method 200 (FIG. 2), including: receiving signals associated with the first wireless network using the first connection, where the signals include the video communicated using the multicast communication protocol; receiving the trigger that warns of the upcoming switching event; requesting the portion of the video; receiving the portion of the video via the first connection using the unicast communication protocol; storing the portion of the video in buffer 526 in memory subsystem 512; accessing the portion of the video in buffer 526 to avoid the disruption of the displayed content in display subsystem 528 associated with the video during the time interval associated with the switching event; and reverting to the video communication using the multicast communication protocol after the switching event. Therefore, the communication technique may be implemented using hardware and/or software.

Electronic device 500 can be (or can be included in) any electronic device with at least one network interface. For example, electronic device 500 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 500, in alternative embodiments, different components and/or subsystems may be present in electronic device 500. For example, electronic device 500 may include one or more additional instances of processing subsystem 510, memory subsystem 512, networking subsystem 514, and/or display subsystem 528. Additionally, one or more of the subsystems may not be present in electronic device 500. Moreover, in some embodiments, electronic device 500 may include one or more additional subsystems that are not shown in FIG. 5. For example, electronic device 500 can include, but is not limited to: a power subsystem (such as a battery), a data collection subsystem, an audio and/or video subsystem, an alarm subsystem, a media processing subsystem, and/or an input/output (I/O) subsystem. Also, although separate subsystems are shown in FIG. 5, in some embodiments, some or all of a given subsystem or component can be integrated into one or more of the other subsystems or component(s) in electronic device 500. For example, communication module 524 may be included in operating system 522.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as communication circuit 518. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios, at least one of which may be used to establish and maintain concurrent connections with different wireless networks using different radio access technologies. Note that the radios in multiple-radio embodiments function in a similar way to the described single-radio embodiments.

An output of a process for designing the integrated circuit, or a portion of the integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While switching between connections using LTE and CDMA was used as an illustrative example of the communication technique, the described embodiments of the communication technique may be used in a variety of network interfaces and with a variety of communication protocols. For example, the communication protocol may be used in the context of switching in GSM or when the electronic device communications with multiple carriers simultaneously or concurrently using a single radio (such as when the electronic device includes a multiple SIM card). Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna;
   a communication circuit, coupled to the antenna, configured to communicate with a first wireless network using a first connection over the antenna and communicate with a second wireless network using a second connection over the antenna, wherein the first connection and the second connection are concurrent, wherein video is communicated to the electronic device via the first connection using a multicast communication protocol, and wherein the communication circuit is configured to switch, for a time interval, from the first connection to the second connection during switching events in order to maintain the second connection;
a processor; and
a memory that stores a program module, wherein the program module is configured to be executed by the processor to avoid disruption of displayed content associated with the video, the program module including:
   instructions for receiving a trigger that warns of an upcoming switching event from the first connection to the second connection;
   instructions for accessing a portion of the video in a buffer in the memory during the time interval associated with the switching event, in response to the trigger, to avoid the disruption of the displayed content associated with the video during the time interval associated with the switching event; and
   instructions for reverting to the video communication using the multicast communication protocol when the communication circuit switches back to the first connection after the switching event.

2. The electronic device of claim 1, wherein a given connection is one of: an active connection in which more data is communicated than is needed to maintain the given connection; and a standby connection in which data needed to maintain the given connection is communicated.

3. The electronic device of claim 1, wherein the first wireless network and the second wireless network are associated with different radio access technologies.

4. The electronic device of claim 1, wherein, during the switching event, the communication circuit receives a paging message using the second connection.

5. The electronic device of claim 1, wherein the trigger is received from the communication circuit.

6. The electronic device of claim 1, wherein the program module further includes instructions for generating the trigger.

7. The electronic device of claim 1, wherein the trigger indicates one of: a start of the switching event and the time interval; and a start of the switching event and a switching pattern that indicates when subsequent switching events occur.

8. The electronic device of claim 1, wherein, prior to reverting to the video communication using the multicast communication protocol, the program module further includes instructions for receiving a second trigger that indicates an end of the switching event.

9. The electronic device of claim 1, wherein, prior to accessing the video in the buffer, the program module further includes:
   instructions for requesting communication of the portion of the video via the first connection using a unicast communication protocol;
   instructions for receiving the portion of the video via the first connection using the unicast communication protocol; and
   instructions for storing the portion of the video in the buffer.

10. The electronic device of claim 1, wherein, prior to accessing the video in the buffer, the program module further includes:
   instructions for receiving the portion of the video via the first connection using a unicast communication protocol; and
   instructions for storing the portion of the video in the buffer.

11. The electronic device of claim 1, wherein the portion of the video in the buffer is associated with a time delay between receipt of the video by the electronic device and display of the content associated with the video.

12. An integrated circuit, comprising:
a communication circuit configured to communicate with a first wireless network using a first connection over an antenna, and communicate with a second wireless network using a second connection over the antenna, wherein the first connection and the second connection are concurrent, and wherein the communication circuit includes:
   a node configured to couple to an antenna to communicate signals associated with wireless communication; and
   control logic configured to:
      receive video via the first connection using a multicast communication protocol;
      receive a trigger signal that warns of an upcoming switching event from the first connection to the second connection;
      receive a portion of the video via the first connection using a unicast communication protocol at least prior to a time interval associated with the switching event, in response to the trigger, to avoid disruption of displayed content associated with the video during the time interval associated with the switching event; and
      switch, for the time interval, from the first connection to the second connection during the switching event in order to maintain the second connection.

13. The integrated circuit of claim 12, wherein the first wireless network and the second wireless network are associated with different radio access technologies.

14. The integrated circuit of claim 12, wherein the trigger is received from a software layer in the electronic device.

15. The integrated circuit of claim 12, wherein, prior to receiving the portion of the video, the control logic is configured to request communication of the portion of the video via the first connection using the unicast communication protocol.

16. A method for avoiding disruption of displayed content, wherein the method comprises:
receiving signals associated with a first wireless network using a first connection over an antenna, wherein the signals include video communicated using a multicast communication protocol, and wherein a second connection with a second wireless network is maintained over the antenna concurrently with the first connection by switching, for a time interval, from the first connection to the second connection during switching events;
receiving a trigger that warns of an upcoming switching event from the first connection to the second connection;
accessing a portion of the video in a buffer in the memory during the time interval associated with the switching event, in response to the trigger, to avoid the disruption of the displayed content associated with the video during the time interval associated with the switching event; and
reverting to the video communication using the multicast communication protocol after the switching event.

17. The method of claim 16, wherein the trigger indicates one of: a start of the switching event and the time interval; and a start of the switching event and a switching pattern that indicates when subsequent switching events occur.

18. The method of claim 16, wherein, prior to reverting to the video communication using the multicast communication protocol, the method further includes instructions receiving a second trigger that indicates an end of the switching event.

19. The method of claim 16, wherein, prior to accessing the video in the buffer, the method further includes:
   requesting communication of the portion of the video via the first connection using a unicast communication protocol;
   receiving the portion of the video via the first connection using the unicast communication protocol; and
   storing the portion of the video in the buffer.

20. The method of claim 16, wherein, prior to accessing the video in the buffer, the method further includes:
   receiving the portion of the video via the first connection using a unicast communication protocol; and
   storing the portion of the video in the buffer.

* * * * *